Dec. 19, 1922.
O. J. ROBINSON.
HAND HARVESTING DEVICE.
FILED FEB. 3, 1921.
1,439,126.
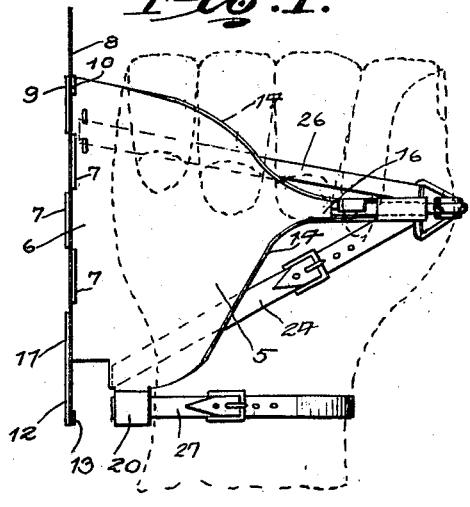
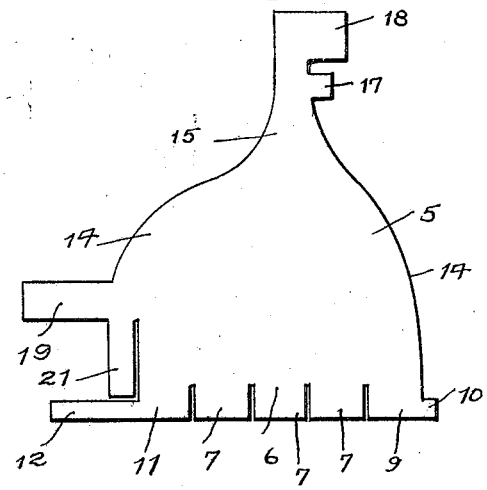
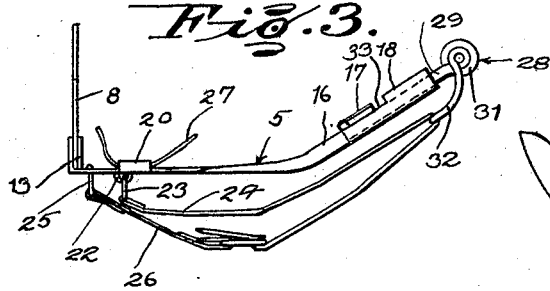
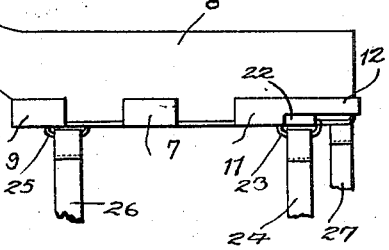
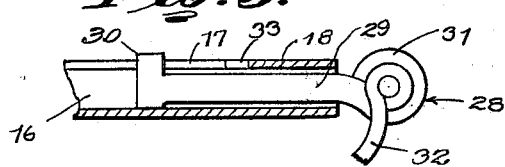
O. J. ROBINSON, INVENTOR.
BY Watson E. Coleman, ATTORNEY.

Patented Dec. 19, 1922.

1,439,126

UNITED STATES PATENT OFFICE.

OSCAR J. ROBINSON, OF CHANDLER, TEXAS.

HAND HARVESTING DEVICE.

Application filed February 3, 1921. Serial No. 442,212.

*To all whom it may concern:*

Be it known that OSCAR J. ROBINSON, a citizen of the United States, residing at Chandler, in the county of Henderson and State of Texas, has invented certain new and useful Improvements in Hand Harvesting Devices, of which the following is a specification, reference being had to the accompanying drawings.

This invention relates to hand harvesting devices and has for its object to provide a device of this character capable of being adjusted to fit the hand of the user.

Another object of the invention is to provide a device of this character which permits the user to grasp a stalk with the same hand to which the harvester is attached, the cutter of the harvester severing the stalk immediately below the hand.

Another object is to provide a device of this character having a cutter holder or supporting plate constructed to conform to a partially closed hand.

A still further object of the invention is to provide a device of this character so arranged that when the stalk is grasped by the hand of the user the knife at the same time engages the stalk without any additional movement on the part of the hand of the user so that a twisting of the wrist or arm grasping the stalk will cause the knife to sever the same.

A still further object of the invention is to provide a device of this character so arranged that it does not interfere with the opening and closing movement of the hand of the user so that one cutter may be attached to each hand of the operator so as to facilitate harvesting of stalks of all kinds in addition to saving time and labor.

A still further object of the invention is to provide a device of this character wherein the supporting plate of the cutter is also formed into a casing adapted to receive a tension latch which permits the device to be firmly secured to the hand of the operator after the securing straps have been adjusted.

With the above and other objects in view, the invention consists in the improved construction and arrangement of parts to be hereinafter more particularly described, fully claimed and illustrated in the accompanying drawings, in which:—

Figure 1 is a view in elevation of a hand harvester constructed in accordance with an embodiment of the invention and showing the same applied to the hand of an operator, Figure 2 is a view of the blank from which the device is formed, Figure 3 is a side elevation, Figure 4 is an end elevation, and Figure 5 is a sectional view of the tension latch and casing.

Referring to the drawings, 5 designates a supporting plate or holder having its end 6 provided with a plurality of extensions 7 which are extended at right angles to the plate 5 and in staggered relation to each other to provide a holder for a cutting element or knife 8. The end extension 9 is provided with a hook 10 adapted to engage one end of the knife while the opposite end extension 11 is provided with an arm 12 having its ends formed into a hook 13 adapted to engage the knife or cutting element. In this way, the knife is held from accidental displacement. The sides 14 of the plate taper from the end 6 to the end 15, the edges of the sides being coiled toward the plate. The sides merge at the end 15 to form a semi-tubular stem 16, said stem including an extension 17 and an extension 18, the extension 18 being smaller than the extension 17. The extension 17 is extended back upon the stem to form a casing while the extension 18 is extended back upon the stem to form a keeper, the purpose of which will be hereinafter described.

Projecting from one side of the plate 5 is an extension 19 having its extremity extended back toward the plate to provide a hook 20. The portion 21 of the plate 5 is extended back upon said plate to form a sleeve 22 for the reception of a ring 23 adapted to receive a strap 24. Carried by the plate, adjacent the extension 9 is a ring 25 also adapted to receive a strap 26. The hook 20 is adapted to receive a strap 27, said strap being positioned at its intermediate portion within the hook so that the ends thereof may be extended around the hand of the user.

A tension latch 28 is provided, said latch including a shank 29 having a finger 30 projecting from one end thereof, the opposite end being formed into an eye 31 adapted to support a loop member 32. This loop member is curved to conform to the contour of the side of the hand. The latch member is intended to be inserted into the stem formed by the merged sides of the plate, and is slidable in the casing formed by the extension 17. The extension 18 terminates adjacent the intermediate portion of the stem and serves as a keeper for the finger 30, a recess 33 being provided between the extensions 17 and 18 for the reception of the finger when the latch is in its unlocked position.

In the application of the device, the plate 5 is placed in engagement with the palm of the hand so that the cutter 8 is disposed parallel to the fifth finger of the hand. The stem 16 of the plate is slightly curved so as to conform to the contour of a part of the hand when partially closed, the edges of the sides 14 being extended upwardly to eliminate sharp edges. The strap 26 is then passed over the back of the hand and through the loop 32, the end of said strap being connected to the buckle carried by the strap 24 so as to adjust the device to the size of the hand of the user. During this operation the tension latch 28 is in its unlocked position, that is, the finger 30 is disposed in the recess 33. The ends of the strap 27 are then passed around the wrist of the user, one end being passed through a buckle carried by the opposite end of the strap. When the device has been adjusted the tension latch 28 is moved inwardly so as to render the straps 27 and 26 taut and hold the device firmly in engagement with the hand. By this arrangement the cutter is disposed substantially in spaced parallel relation to the fingers of the hand and at the same time, in view of the formation of the stem it is possible for the user to grasp a stalk and hold the same. The arm or wrist of the user is then moved so as to permit the knife to engage and sever the stalk. These various movements are simultaneous. After the stalk has been severed it may be deposited in the desired receptacle without requiring the operator to relinquish his hold. In view of this, one of the harvesting devices can be attached to each hand of the operator, as they do not interfere with the free movement of the hand so that every stalk grasped by the hand of the operator may be simultaneously severed.

From the foregoing it will be readily seen that this invention provides a novel form of hand harvester capable of being adjusted to accommodate the size of the hand of the user and which permits the holding and cutting operation to be performed with one hand.

What is claimed is:—

1. A hand harvester of the character described comprising a plate having one end provided with a plurality of staggered extensions, each of the end extensions being provided with hooks, a cutter disposed between said staggered extensions and engaged with the hooks, and means carried by the plate for connecting the same to a hand of an operator.

2. A hand harvester comprising a plate constructed to conform to the contour of a partially closed hand, one end of said plate being provided with a casing and a keeper, a bolt slidable in said casing, a finger carried by the bolt for engagement with the keeper, securing means carried by the plate, said means being adapted to engage the shank, whereby the securing means is rendered taut upon movement of the shank inwardly of the casing.

3. A hand harvester of the character described comprising a plate constructed to conform to the contour of a partially closed hand, the sides of said plate merging at one end to form a casing adapted to receive a latch bolt, straps connected to the opposite end of the casing in spaced parallel relation to each other, one of said straps being adapted to engage a loop member carried by the bolt, the end of the strap being secured to the remaining strap, and additional securing means carried by the plate adjacent one of the first mentioned straps.

In testimony whereof I hereunto affix my signature.

OSCAR J. ROBINSON.